United States Patent [19]

Wijnterp

[11] 4,047,095
[45] Sept. 6, 1977

[54] BRUSHLESS THREE-PHASE CURRENT GENERATOR HAVING A DEVICE FOR SELF-EXCITATION AND AUTOMATIC CONTROL OF THE ENERGIZING CURRENT

[75] Inventor: Wierd Wijnterp, Hengelo, Netherlands

[73] Assignee: Heemaf B.V., Hengelo, Netherlands

[21] Appl. No.: 605,180

[22] Filed: Aug. 15, 1975

[30] Foreign Application Priority Data
Aug. 22, 1974 Netherlands ................ 7411221

[51] Int. Cl.$^2$ ........................................... H02P 9/30
[52] U.S. Cl. .................................... 322/17; 322/25; 322/28; 322/59
[58] Field of Search .................. 322/25, 28, 17, 59

[56] References Cited
U.S. PATENT DOCUMENTS

| 3,605,006 | 9/1971 | Nagae et al. | 322/25 X |
| 3,758,842 | 9/1973 | Kudlacik | 322/25 |

FOREIGN PATENT DOCUMENTS
88,339  1/1958  Netherlands

*Primary Examiner*—Robert J. Hickey
*Attorney, Agent, or Firm*—Hill, Gross, Simpson, Van Santen, Steadman, Chiara & Simpson

[57] ABSTRACT

A brushless three-phase current generator having a fed-back, controllable device for self-excitation and automatic control of the energizing current, said device comprising controllable means for deriving from the generator output part of the output voltage and the load current of the generator and the vectorial combination and supply thereof to a multi-phase rectifier whose output is connected to a stationary d.c. energizing winding of an excitor, the rotating multi-phase winding of which enables the rotating field winding of the generator through a commonly rotating rectifier, wherein the synchronous reactance of the multi-phase winding of the excitor at the frequency corresponding to the nominal speed is achieved, which is greater than the equivalent impedance of the generator field winding.

7 Claims, 2 Drawing Figures

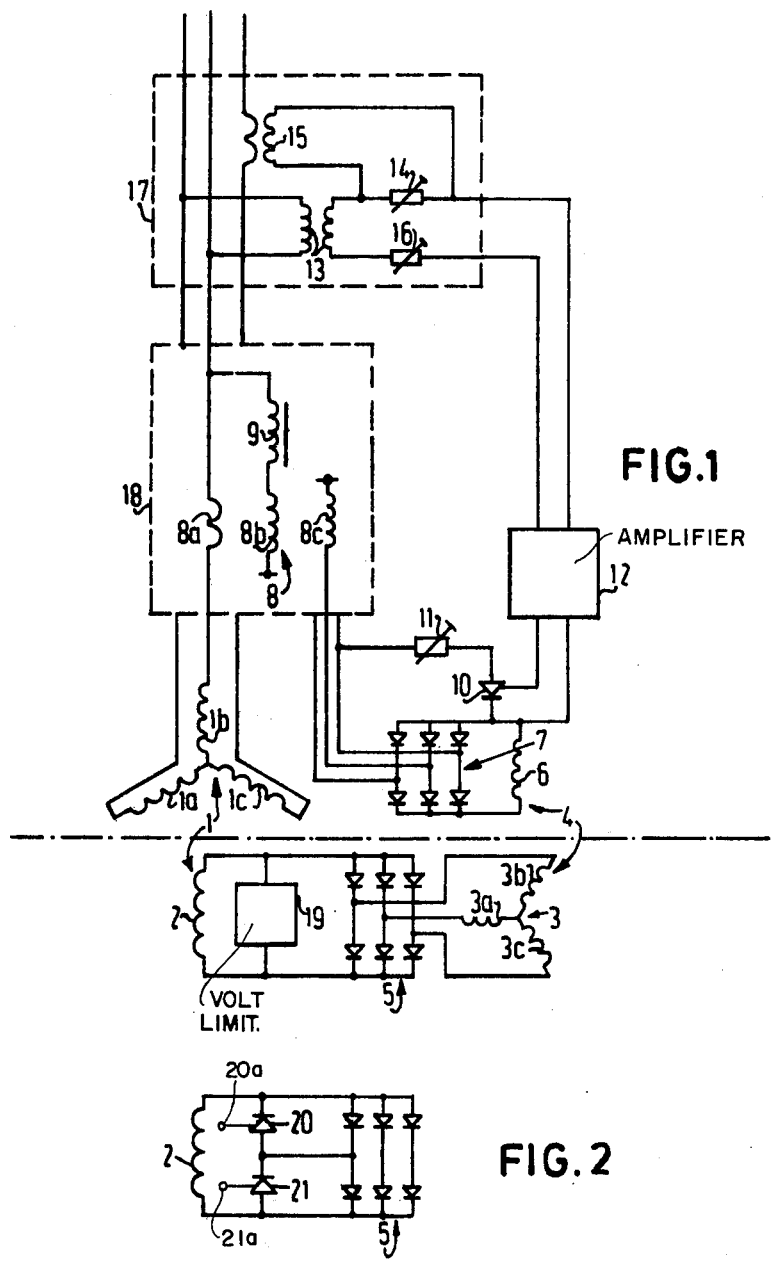

BRUSHLESS THREE-PHASE CURRENT GENERATOR HAVING A DEVICE FOR SELF-EXCITATION AND AUTOMATIC CONTROL OF THE ENERGIZING CURRENT

BACKGROUND OF THE INVENTION

The invention relates to a brushless three-phase current generator having a fed-back, controllable device for self-excitation and automatic control of the energizing current, said device comprising controllable means for deriving from the generator output part of the output voltage and the load current of the generator and the vectorial combination and supply thereof to a multiphase rectifier whose output is connected to a stationary d.c. energizing winding of an exciter, the rotating multi-phase winding of which enables the rotating field winding of the generator through a commonly rotating rectifier. Such a generator is known from the U.S. Pat. No. 3,605,006.

The brushless current supply to the rotating field winding of the generator from the multi-phase winding of an exciter having a stationary d.c. energizing winding through a commonly rotating rectifier involves various disadvantages. Assuming the exciter voltage to be proportional to the exciter field current and the number of revolutions and the generator voltage to be proportional to the generator field current and the number of revolutions, the number of revolutions has a square effect on the relationship between the exciter field current and the generator voltage. If the number of revolutions is slightly too low, the exciter field winding is exposed to the risk of burning. A further problem resides in the adverse effect of the threshold voltage of the two rectifiers on the voltage building up, which will practically always require an auxiliary device. Moreover, the magnetic time constants of the exciter field and the generator field have a delaying effect on the adjustment of the voltage in the event of rapid load variations.

The invention has for its object to obviate the aforesaid disadvantages of the brushless embodiment. According to the invention this is achieved by a synchronous reactance of the multi-phase winding of the exciter at the frequency corresponding to the nominal speed, which is greater than the equivalent resistance of the generator field winding. Owing to the predominant influence of the reactance the generator field current is proportional to the exciter field current and independent of the speed. Then the generator voltage varies in a wide range of speed directly proportionally to the speed and the frequency, which relationship is frequently most desirable and permits of dispensing with an amplification of the exciter field current involving the risk of heating. Building up the voltage is already possible at a low speed and particular expedients are not required for this purpose. The high reactance furthermore improves a rapid voltage control in the event of great, abrupt load changes.

Said reactance is preferably at least 2.5 times that of said equivalent resistance.

It should be noted that it is known from Dutch Pat. No. 88,339 to choose a given ratio between the reactance of part of the current circuit and the equivalent resistance of the supply rectifier and the energizing winding with a synchronous generator having a device for self-excitation and automatic control of the energizing current.

In order to further improve the controllability of the generator it is preferred to connect a circuit branch with variable impedance parallel to the rectifier feeding the excitor, to proportion the magnitude of the component determining the fed-back current so that at the nominal speed the energizing current determined by said component would produce a slight voltage excess of the generator and to control the controllable impedance so that at the nominal speed the energizing current is reduced to the value required for producing the desired generator voltage. The excessively strong feedback or, in other terms, the increase in circulating amplification of the control-circuit provides a rapid control of the generator. This property becomes manifest, for example, in the start and in the fast post-control of the generator voltage in the event of load shocks. This applies particularly when the controllable impedance has a slight inertia. An example of such a rapidly controllable impedance is a thyristor, which is controlled in the present device from the generator output.

The commonly rotating rectifier is bridged by a voltage limiter in order to protect it against excessive voltages, for example, in a non-sychronous operation of the generator. When choosing the great reactance of the multi-phase winding according to the invention the voltage limiter in a preferred embodiment will be formed by thyristors. Owing to the high reactance of the multi-phase winding it may be considered as a current source and in the event of a short-circuit on the d.c. side the current passing through the rectifier varies only little. In the event of excessive voltage the thyristors break down and convey current. Owing to the small resistance the dissipation is slight and does not give rise to difficulties. Moreover, the thyristors occupy only little space.

It is possible to control the voltage value at which breakdown occurs by connecting the control-input of a thyristor to a network wound parallel to the field winding. However, this control-input may remain open.

The invention will be described more fully with reference to the accompanying drawings, which show one embodiment of the invention.

FIG. 1 shows schematically one embodiment of the invention and

FIG. 2 shows a detail of the diagram of FIG. 1.

The generator 1 comprises a rotating field winding 2, which is fed from the multi-phase winding 3 of the exciter 4 rotating in common with the field winding 2 through a rectifier 5 formed by a diode bridge.

The stationary d.c. energizing winding 6 of the excitor 4 is fed from the rectifier 5 formed by a diode bridge. The diode bridge 7 is fed from the output of the generator 1. The supply is obtained in known manner with the aid of a voltage-dependent component and a current-dependent component, which may be derived by means of the transformer 8, 9 shown schematically from the output of the generator. A thyristor 10 having an adjustable bias resistor 11 is connected parallel to the rectifying bridge 7. The thyristor is controlled from the controllable amplifier 12. The amplifier 12 is included in a control-circuit comprising a voltage transformer 13 supplying a control-voltage depending upon the output voltage of the generator, a controllable impedance 14, a current converter 15 and a controllable impedance 16. The fed-back circuit is proportioned such that a slightly higher energizing current is produced than is required for producing the nominal generator voltage. The thyristor is controlled, in dependence upon the adjusted value of the controlling amplifier 12, so that in nominal operation the energizing current is reduced to the desired value.

The circuit indicated inside the lines 17 and 18 may be constructed in a different way without a basic change of the operation of the device.

The steps proposed by the invention provide a minor dependence upon frequency of the energizing current and an increased round-about amplification of the control-circuit so that a rapid response to variations, for example, at the start and in the event of load shocks, is ensured, whilst in nominal operation the departure from the nominal voltage is slight, for example, less than 0.5 percent.

A further advantage of the step according to the invention is that even in the case of a defect in the control-device a reasonable control of the generator is still possible.

In order to protect the rectifier 5 a voltage limiter 19 is connected in parallel thereto. In a preferred embodiment shown in FIG. 2 the voltage limiter 19 may be formed by thyristors 20, 21, which will break down when a given threshold voltage is exceeded. Since the winding 3 owing to its comparatively high reactance may be considered to constitute a current source, the breakdown of the thyristors hardly changes the current through the rectifier 5. The value of said threshold voltage can be regulated by a control through the control-inputs 202 and 212 of the thyristors 20, 21. The use of thyristors has in this case the advantage that they occupy little space on the rotor and produce a small amount of heat.

What I claim is:

1. A brushless three-phase current generator having a rotating field winding and a fed-back, controllable device for self-excitation and automatic control of energizing current, said device comprising controllable means for deriving from the generator output part of the output voltage and the load current of the generator and for the vectorial combination and supply thereof to a multi-phase rectifier whose output is connected to a stationary d.c. energizing winding of an excitor, said excitor having a rotating multi-phase winding which enables the rotating field winding of the generator through a commonly rotating rectifier, characterized in that the synchronous reactance of each phase of the multi-phase winding of the excitor at the frequency corresponding to the nominal speed is greater than the equivalent resistance of the generator field winding.

2. A device as claimed in claim 1 characterized in that said reactance is at least 2.5-times said equivalent resistance.

3. A device as claimed in claim 1, characterized in that a circuit branch of controllable impedance is connected in parallel to the rectifier feeding the excitor, the magnitude of the fed-back, current-determining component is proportioned such that at the nominal speed the energizing current determined by said component would produce a slightly excessive generator voltage and said controllable impedance is controlled such that at the nominal speed the energizing current is reduced to the value required for producing the desired generator voltage.

4. A device as claimed in claim 3, characterized in that said controllable impedance is formed by a thyristor which is controlled from the output of the generator.

5. A device as claimed in claim 1 characterized by a voltage limiter bridging the rectifier rotating in common.

6. A device as claimed in claim 5, characterized in that said voltage limiter is formed by thyristors.

7. A device as claimed in claim 6, characterized in that the control-input of the thyristors is connected to a network connected in parallel to the field winding.

* * * * *